United States Patent [19]

Heyl

[11] 4,161,748
[45] Jul. 17, 1979

[54] MIXING OF SECAM COLOR-T.V. SIGNALS

[75] Inventor: Bodo Heyl, Weiterstadt, Fed. Rep. of Germany

[73] Assignee: Robert Bosch GmbH, Stuttgart, Fed. Rep. of Germany

[21] Appl. No.: 863,303

[22] Filed: Dec. 22, 1977

[51] Int. Cl.² .......................................... H04N 9/535
[52] U.S. Cl. ...................................... 358/22; 358/23
[58] Field of Search ....................... 358/21, 22, 30, 14, 358/11, 23, 182, 183

[56] References Cited

U.S. PATENT DOCUMENTS 3,296,367  1/1967  Cassagne et al. ..................... 358/22

Primary Examiner—John C. Martin
Attorney, Agent, or Firm—Michael J. Striker

[57] ABSTRACT

A plurality of SECAM color-T.V. signals are to be mixed. Each comprises a luminance component and an FM color component. For each individual signal, the color component is separated from the luminance component, frequency-demodulated, amplitude-modulated, and then superimposed upon the respective luminance component to form a frequency-multiplexed modified signal. The plurality of thusly modified signals are then mixed using a single mixing channel. The mixed luminance component and the mixed color component are separated on the basis of frequency, and the mixed color component is amplitude-demodulated, then frequency-modulated and then superimposed upon the mixed luminance component, to yield a SECAM color-T.V. signal which constitutes a mix of the original signals.

13 Claims, 2 Drawing Figures

MIXING OF SECAM COLOR-T.V. SIGNALS

BACKGROUND OF THE INVENTION

The present invention relates to the mixing of two or more SECAM color-T.V. signals to produce a resultant combined SECAM color-T.V. signal which is a linear combination of the original signals.

A process for the mixing of SECAM color-T.V. signals is disclosed in "Fernsehtechnik," Schoenfelder, H., Part 2, Justus von Liebig Verlag, Darmstadt, pp. 16/1B, 16/1 and 16/2. This process recognizes that additive mixing of frequency-modulated signals does not yield a linear combination of the signals being mixed. In a SECAM color-T.V. signal, the luminance component indicates luminance by means of magnitude, but the two color difference signals, transmitted during alternate respective horizontal-line periods, are frequency-modulated. Accordingly, this known mixing process first takes each SECAM color-T.V. signal to be mixed, and separates the frequency-modulated color-information component thereof from the luminance component. The frequency-modulated color-information component is then frequency-demodulated. Because the base (unmodulated) frequency of the carrier signal for the two color-difference signals alternates, having one value for one color-difference signal, and a different value for the other color-difference signal, this frequency-demodulation is performed on a line-by-line basis, to yield the video-frequency color-difference signals in their alternate horizontal line periods. This is done for each of the original SECAM color-T.V. signals to be mixed. Thereafter, the luminance components of the signals are mixed, and separately therefrom the video-frequency color-information signals are mixed; i.e., the mixing of the luminance components of the signals to be mixed and the mixing of the color-information components of the signals to be mixed is performed in parallel, using two mixing channels. Thereafter, the color-information component mix is frequency-modulated and superimposed upon the mixed amplitude-modulated luminance components, to yield a standard SECAM color-T.V. signal which constitutes a linear combination of the original signals, both with respect to luminance and color information. This technique, compared to the mixing techniques used for PAL and NTSC color-T.V. signals, disadvantageously necessitates the use of two mixing channels, one for the luminance information, another for the color information. The two mixing channels hitherto required for mixing SECAM color-T.V. signals inherently increases the cost and bulk of SECAM mixing circuitry, relative to the one-mixing-channel circuitry which can be used for PAL and NTSC color-T.V. signals.

SUMMARY OF THE INVENTION

It is a general object of the invention to mix SECAM color-T.V. signals using only a single mixing channel.

This can be achieved as follows: Each SECAM color-T.V. signal to be mixed is split into aluminance component and a video-frequency color component. The deriving of the video-frequency color component can be performed as in the prior art, utilizing line-by-line frequency-demodulation of the alternately transmitted color-difference signals. The video-frequency color component is then amplitude-modulated and thereafter superimposed upon the luminance component. Both the luminance and the color component of the color-T.V. signal are now in a form unproblematic for mixing. This is done for each SECAM color-T.V. signal to be mixed. The thusly modified SECAM color-T.V. signals can now be additively mixed, in a single mixing channel, the resultant of which is a linear combination of the thusly modified SECAM color-T.V. signals, the mixed luminance components and the mixed amplitude-modulated color components being present as a frequency multiplex. The frequency multiplex is then separated on the basis of frequency into the mixed luminance component and the mixed AM color component. The mixed AM color component is amplitude-demodulated, to yield a video-frequency mix of the color components. This video-frequency color-information mix is then frequency-modulated in accordance with SECAM standards, and superimposed upon the mixed luminance component, to yield a standard SECAM color-T.V. signal constituting a mix of the original signals.

Preferably, the individual amplitude-modulated color components are suppressed-carrier signals, and the carrier signal utilized for this amplitude modulation is horizontal-frequency-coupled with a half-line offset relative to the SECAM color-T.V. signal undergoing this conversion of its color component; i.e., the carrier used for the amplitude modulation is coupled to the horizontal frequency of the T.V. signal involved, and the frequency of the carrier is an odd multiple of one-half the line frequency. This technique per se is disclosed, for example, in Telefunken Zeitung 36, 1963, No. ½ pp. 89–99. When the video-frequency color component is amplitude-modulated in this way, the subsequent separation of the mixed amplitude-modulated color component from the mixed luminance component can be effected using comb-filter techniques, for example of the type disclosed in Telefunken Zeitung 37, 1964, No. 2, pp 115–135.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

In the compatible PAL, NTSC and SECAM color-T.V. systems, color information is transmitted within the frequency range occupied by the luminance information. The color information is modulated onto a color carrier, which is additively superimposed upon the luminance signal containing luminance information. When proceeding in accordance with SECAM-Standard SECAM IIIopt., the color carrier has one of the two color-difference signals modulated onto it during alternate horizontal-line intervals, with the other color-difference signal being modulated onto the color carrier during the intervening horizontal-line intervals, the color-difference signals being frequency-modulated onto the color carrier. The unmodulated frequency of the color carrier alternates between two different values, one used when modulating thereonto one color-difference signal, the other used when modulating thereonto the other color-difference signal.

Figure 1:
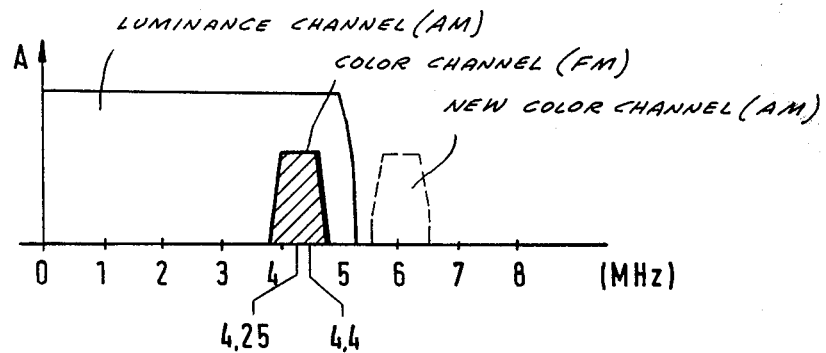
FIG. 1 depicts the frequency spectrum of the luminance and color components of a standard SECAM color-T.V. signal, and of such a signal modified preliminary to mixing in accordance with the present invention.

FIG. 1 depicts the spectrum of the luminance and color information of the luminance and color channels. The solid line indicates the frequency range of the luminance signal. This frequency range, extending from 0 to about 5 MHz, also encompasses the frequency range of the color-information signal (shown hatched). The narrow band of the color-information signal is located in the upper part of the frequency range of the luminance signal. The frequencies 4.25 and 4.4 MHz are the two base (unmodulated) values which the frequency of the color carrier alternately assumes, one for modulation of one color-difference signal, the other for modulation of the other color-difference signal. As already stated, the color information is present in frequency-modulated form.

To effect the mixing of a plurality of SECAM color-T.V. signals, the frequency-modulated color signal is separated from the luminance signal and converted into an amplitude-modulated color-information signal. This converted (amplitude-modulated) color signal is then frequency-multiplexed with the luminance signal, which is already in a form unproblematic for mixing. According to the preferred concept of the invention, a part of the frequency range of the luminance-signal channel, the part normally including the frequency range of a normal SECAM color-information signal, is suppressed and, in amplitude-modulated form, relocated at a frequency location above the upper limit of the frequency range of the normal luminance-signal channel, at about 6 MHz (see the broken line in FIG. 1). This frequency-multiplexed signal can then be subjected to a mixing process using one-channel mixing circuitry.

Figure 2:
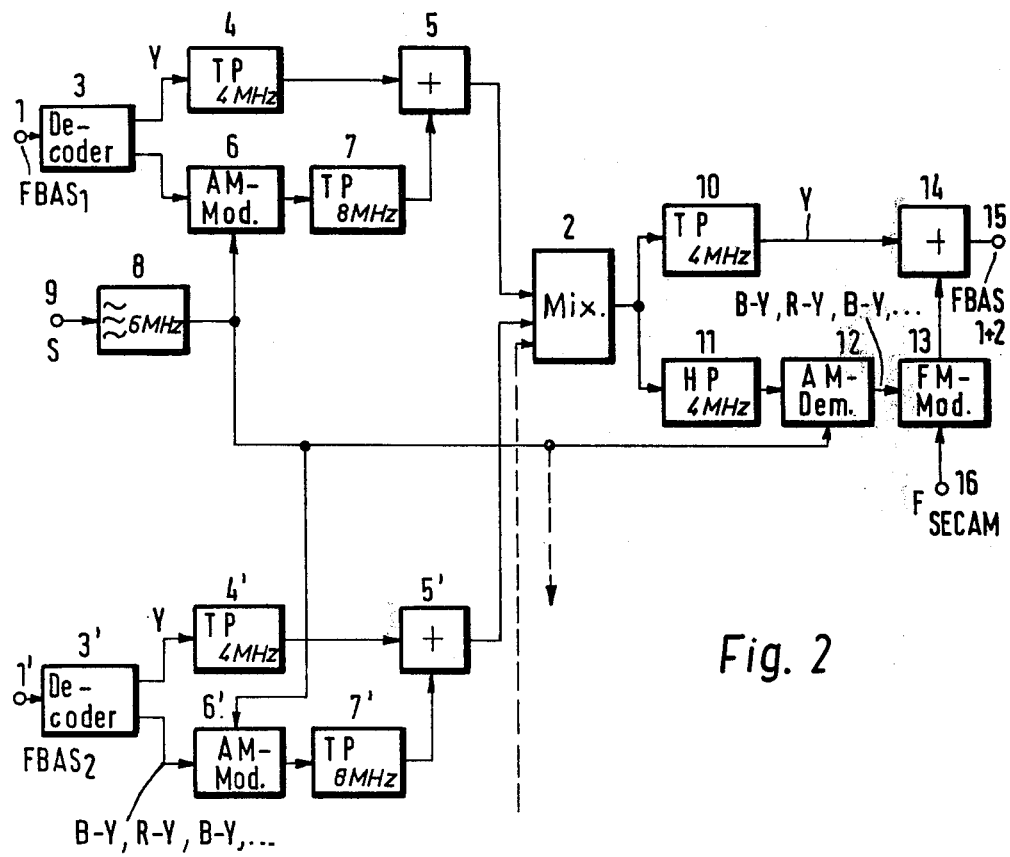
FIG. 2 depicts an exemplary block circuit diagram of a mixing system utilizing only one mixing channel for the mixing of SECAM color-T.V. signals.

FIG. 2 is a block circuit diagram depicting such a one-channel mixing system. Blocks performing identical functions are denoted by corresponding numerals. Let it be assumed that two different SECAM color-T.V. signals $FBAS_1$ and $FBAS_2$, to be additively mixed, are supplied to respective input terminals 1 and 1'. The SECAM color-T.V. signal $FBAS_1$ applied to terminal 1 is transmitted to a SECAM decoder 3, which decodes the SECAM color-T.V. signal to yield the luminance signal component Y and the video-frequency color-information signal component of the video signal. The luminance signal Y is transmitted through a low-pass filter having a cutoff frequency of about 4 MHz to the input of an adding stage 5. The color-information signal (which as already explained comprises the two color-difference signals during alternate respective horizontal-line intervals) is amplitude-modulated by an amplitude modulator 6 onto a carrier having a frequency of about 6 MHz, then transmitted through a low-pass filter having a cutoff frequency of about 8 MHz, and then applied to the other input of adding stage 5. The amplitude modulator 6 receives its 6 MHz carrier signal from a carrier-signal generator 8. Advantageously, the amplitude modulator 6 is designed as a balanced modulator producing at its output a suppressed-carrier amplitude-modulated signal. The frequency of the carrier frequency generator 8 is horizontal-line-frequency coupled by means of a synchronizing signal S applied to terminal 9 of generator 8, in such a manner as to establish a half-line offset.

The frequency-multiplexed signal produced at the output of adding stage 5, consisting of a luminance signal and an amplitude-modulated color signal, is now applied to one input of a mixer 2. The other input of mixer 2 receives the SECAM color-T.V. signal $FBAS_2$ applied to the terminal 1', after this second signal has been converted in the same manner as described with respect to first signal $FBAS_1$. The mixer 2 can for example be an AB-mixer of the type used for NTSC or PAL color-T.V. signals. The signal produced at the output of mixer 2, frequency-multiplexed due to the mixing process, is applied to a low-pass filter 10 having a cutoff frequency of about 4 MHz and to a high-pass filter 11 likewise having a cutoff frequency of about 4 MHz, to separate the mixed luminance information from the mixed color information. The selected frequency coupling technique utilizing a half-line offset would additionally make possible the use of a comb filter to effect this signal separation. The still amplitude-modulated color-information signal is demodulated in an amplitude demodulator 12. The resultant signal constituted of the two video-frequency color-difference signals B-Y and R-Y in alternate horizontal-line periods, is frequency-modulated in a frequency modulator 13 and, in an adding stage 14, additively superimposed upon the luminance signal Y. At output terminal 15 of adding stage 14, there is available a linear combination of the two SECAM color-T.V. signals $FBAS_1$, $FBAS_2$ applied to the input terminals 1, 1'.

Because a suppressed-carrier amplitude-modulated signal cannot of itself be demodulated, the amplitude demodulator 12 utilized is a synchronous demodulator, to which is fed the carrier signal generated by carrier signal generator 8. Connected between the amplitude modulators 6, 6', ..., and the amplitude demodulator 12 will typically be phase-adjusting circuitry (non-illustrated), making it possible to match the phase of the received carrier signal.

Frequency modulator 13, at its terminal 16, receives a SECAM-system color carrier signal, the frequency of which alternates between two different values for alternate horizontal-line periods; also, the phase of this signal is periodically changed back and forth in accordance with SECAM-standards. This SECAM-system color carrier signal serves to synchronize the frequency modulator 13 during horizontal-blanking intervals.

Because the synchronously demodulated color-information signal produced at the output of amplitude demodulator 12 may include a residual component of the carrier signal utilized in the demodulation, this residual carrier component can be eliminated by passing the demodulated signal through a low-pass filter operative for suppressing those frequency components whose frequencies lie outside the frequency range of the video-frequency color-difference signals.

It will be understood that each of the elements described above, or two or more together, may also find a useful application in other types of circuits and systems, differing from the types described above.

While the invention has been illustrated and described as embodied in the mixing of two SECAM color-T.V. signals to yield a linear composite thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of mixing a plurality of SECAM color-T.V. signals, comprising, in combination, these steps:
   for each SECAM color-T.V. signal, separating the frequency-modulated color component thereof from the luminance component, frequency-demodulating the color component to yield a video-frequency color component, amplitude-modulating the video-frequency color component to yield an amplitude-modulated color component, and then superimposing the amplitude-modulated color component onto the luminance component to form a frequency-multiplex signal corresponding to the original SECAM color-T.V. signal;
   mixing these frequency-multiplex signals using a single mixing channel to yield a frequency-multiplex mix signal which is comprised of a luminance mix component and a color mix component;
   separating the color mix component from the luminance mix component on the basis of frequency;
   amplitude-demodulating the color mix component to yield a video-frequency mix of the color components of the original SECAM color-T.V. signals;
   frequency-modulating the video-frequency color-component mix to yield a frequency-modulated mixed color component for a SECAM color-T.V. signal; and
   superimposing the frequency-modulated mixed color component onto the luminance mix component to yield a SECAM color-T.V. signal which constitutes a mix of the original SECAM color-T.V. signals.

2. The method defined in claim 1, when amplitude-modulating the video-frequency color component of the individual original signals utilizing for the amplitude modulation a carrier whose frequency is closer to the upper limit of the frequency range of the luminance component than to the lower limit thereof.

3. The method defined in claim 2, utilizing a carrier whose frequency is higher than the upper limit.

4. The method defined in claim 2, utilizing a carrier whose frequency is coupled to the horizontal-line frequency of the respective original SECAM color-T.V. signals.

5. The method defined in claim 4, utilizing a carrier whose frequency is offset relative to the horizontal-line frequency.

6. The method defined in claim 5, the frequency of the carrier being an odd multiple of one half the horizontal-line frequency.

7. The method defined in claim 1, when amplitude-modulating the video-frequency color component of the individual original signals suppressing the carrier in the resultant amplitude-modulated signal.

8. The method defined in claim 7, when amplitude-demodulating the color mix component utilizing a synchronous demodulator.

9. The method defined in claim 1, prior to superimposing the amplitude-modulated color component of each individual signal onto the respective luminance component thereof passing the luminance component through a low-pass filter to suppress spectral components stemming from the frequency-modulated color component of the original SECAM color-T.V. signal.

10. The method defined in claim 1, prior to superimposing the amplitude-modulated color component of each individual signal onto the respective luminance component thereof passing the amplitude-modulated color component through a low-pass filter to suppress those spectral components whose frequencies are above the upper sideband of the amplitude-modulated color component.

11. The method defined in claim 1, the separating of the color mix component from the luminance mix component comprising passing the frequency-multiplex mix signal through a low-pass filter to obtain the luminance mix component and through a high-pass filter to obtain the color mix component.

12. The method defined in claim 8, passing the output signal of the synchronous demodulator through a low-pass filter to suppress those spectral components whose frequencies are outside the frequency range of the video-frequency color components.

13. The method defined in claim 1, the separating of the color mix component from the luminance mix component comprising passing the frequency-multiplex mix signal through a comb filter.

* * * * *